US009626002B1

(12) United States Patent
Schpok

(10) Patent No.: US 9,626,002 B1
(45) Date of Patent: Apr. 18, 2017

(54) SYSTEMS AND METHODS FOR ORIENTING A USER IN A MAP DISPLAY

(71) Applicant: GOOGLE INC., Mountain View, CA (US)

(72) Inventor: Joshua S. Schpok, Seattle, WA (US)

(73) Assignee: GOOGLE INC., Mountain View, CA (US)

( * ) Notice: Subject to any disclaimer, the term of this patent is extended or adjusted under 35 U.S.C. 154(b) by 0 days.

(21) Appl. No.: 14/995,385

(22) Filed: Jan. 14, 2016

(51) Int. Cl.
G06F 3/01 (2006.01)
G06T 11/60 (2006.01)
G06F 3/0481 (2013.01)
G06F 3/0484 (2013.01)
G01C 21/26 (2006.01)
G01C 21/36 (2006.01)

(52) U.S. Cl.
CPC .............. *G06F 3/017* (2013.01); *G01C 21/26* (2013.01); *G01C 21/3676* (2013.01); *G06F 3/0481* (2013.01); *G06F 3/04842* (2013.01); *G06T 11/60* (2013.01)

(58) Field of Classification Search
CPC ......... G06F 3/017; G06F 3/048; G01C 21/00; G09G 5/00
See application file for complete search history.

(56) References Cited

U.S. PATENT DOCUMENTS

| 8,453,060 | B2* | 5/2013 | Ofek | G06F 17/3087 715/757 |
| 8,930,141 | B2* | 1/2015 | Wither | G01C 21/3635 340/995.1 |
| 2007/0273758 | A1* | 11/2007 | Mendoza | G06F 17/3087 348/39 |
| 2008/0040029 | A1* | 2/2008 | Breed | B60N 2/2863 701/514 |
| 2008/0285886 | A1* | 11/2008 | Allen | G06F 17/30241 382/284 |
| 2010/0123737 | A1* | 5/2010 | Williamson | G01C 21/3647 345/672 |
| 2010/0188432 | A1* | 7/2010 | Tsai | G06F 3/017 345/684 |
| 2010/0293173 | A1* | 11/2010 | Chapin | G06F 17/3087 707/759 |

(Continued)

OTHER PUBLICATIONS

Anguelov et al., "Google Street View: Capturing the World at Street Level," IEEE Computer Society, pp. 32-38 (2010).

(Continued)

*Primary Examiner* — Thomas Tarcza
*Assistant Examiner* — Alex C Dunn
(74) *Attorney, Agent, or Firm* — Marshall, Gerstein & Borun LLP

(57) ABSTRACT

To orient a user within a map display, a portable device displays a panoramic view representative of the user's real-world surroundings. The portable device also displays a map representation of an adjacent area above the panoramic view so that the area displayed in the map representation appears further away than the real-world surroundings depicted in the panoramic view. The portable device may also display an intersection which includes a commonly shared boundary between the panoramic view and the map representation so that the user can identify the relationship between the two displays.

20 Claims, 10 Drawing Sheets

(56) References Cited

U.S. PATENT DOCUMENTS

| | | | | |
|---|---|---|---|---|
| 2011/0283223 A1* | 11/2011 | Vaittinen | ............ | G01C 21/3647 |
| | | | | 715/781 |
| 2014/0152657 A1* | 6/2014 | Johnston | ................. | G06F 3/011 |
| | | | | 345/419 |
| 2016/0041628 A1* | 2/2016 | Verma | ..................... | G06F 3/017 |
| | | | | 345/156 |

OTHER PUBLICATIONS

Google Maps (2016). Retrieved from the Internet at: https://www.google.com/maps/@41.8719259.-87.635622.15.25z.

Lorenz et al., "Interactive Multi-Perspective View of Virtual 3D Landscape and City Models," (2008).

* cited by examiner

SYSTEMS AND METHODS FOR ORIENTING A USER IN A MAP DISPLAY

FIELD OF THE DISCLOSURE

The present disclosure relates to displaying map data and more particularly, to simultaneously displaying a panoramic view and a non-panoramic map representation of contiguous geographic areas to orient a user within a map display.

BACKGROUND

Today, digital maps of geographic areas are commonly displayed on computing devices, such as computers, tablets, and mobile phones via map applications, web browsers, etc. Many map applications provide the user with the ability to select the type of map information or features for viewing as well as to adjust the display of the digital map. For example, the user may select among several scales and map viewing modes, such as a basic map mode that presents a traditional road-map view, a satellite mode, a street-level mode, or a three dimensional (3D) view.

SUMMARY

For a geographic area, a mapping application on a portable device may display a panoramic 3D view of buildings, streets, trees, etc., which correspond to a first portion of the geographic area (e.g., a southern portion of Seattle, Wash.) at the bottom of the display so that the panoramic view appears to be in the foreground. In the background, just above the panoramic view, the mapping application may display a map representation of a second portion of the geographic area (e.g., a northern portion of Seattle) which is contiguous with the first portion. In some embodiments, the panoramic view and the map representation are combined and intersect at a common geographic boundary shared between the first and second portions of the geographic area to form a combined panoramic/map display. Also in some embodiments, the panoramic view and the map representation are oriented in accordance with the orientation of the portable device.

Accordingly, when a user views a combined panoramic/map display of an area which includes her current location, the panoramic view may be oriented in the same direction as the user and may depict objects which the user sees in front of her in the real-world. Moreover, the map representation appears in the background so that the user recognizes that locations and points of interest (POIs) depicted in the map representation are farther away from her current location than the objects in the panoramic view. POIs may include specific locations which may be of interest to a user, such as hotels, restaurants, businesses, gas stations, stadiums, concert halls, etc. As a result, the user may approach the locations and POIs depicted in the map representation by travelling in the direction she is currently facing. In this manner, by displaying a panoramic view of objects which physically appear in front of the user, the combined panoramic/map display helps orient the user within the context of the map representation.

In particular, an example embodiment of the techniques of the present disclosure is a method in a portable device for displaying map data. The method includes obtaining, in a portable device, a request for map data of a geographic area and displaying a panoramic view of geolocation imagery for a first portion of the geographic area. The method further includes simultaneously displaying a non-panoramic map representation for a second portion of the geographic area, including displaying an intersection between the panoramic view and the non-panoramic map representation at a common geographic boundary shared between the first portion of the geographic area and the second portion of the geographic area.

Another example embodiment is a portable device including a user interface, one or more processors coupled to the user interface, and a non-transitory computer-readable memory coupled to the one or more processors and storing thereon instructions. The instructions, when executed by the one or more processors, cause the portable device to obtain a request for map data of a geographic area and display, on the user interface, a panoramic view of geolocated imagery for a first portion of the geographic area. The instructions further cause the portable device to simultaneously display, on the user interface, a non-panoramic map representation for a second portion of the geographic area and display an intersection between the panoramic view and the non-panoramic map representation at a common geographic boundary shared between the first portion of the geographic area and the second portion of the geographic area.

Yet another example embodiment is a method in a server device for displaying map data. The method includes receiving, in a server device, a request for map data of a geographic area and generating a panoramic view of geolocated imagery for a first portion of the geographic area. The method further includes generating a non-panoramic map representation for a second portion of the geographic area including generating an intersection between the panoramic view and the non-panoramic map representation at a common geographic boundary shared between the first portion of the geographic area and the second portion of the geographic area and causing the panoramic view, the non-panoramic map representation, and the intersection between the panoramic view and the non-panoramic map representation to be displayed on a portable device.

DETAILED DESCRIPTION

Overview

Figure 1:
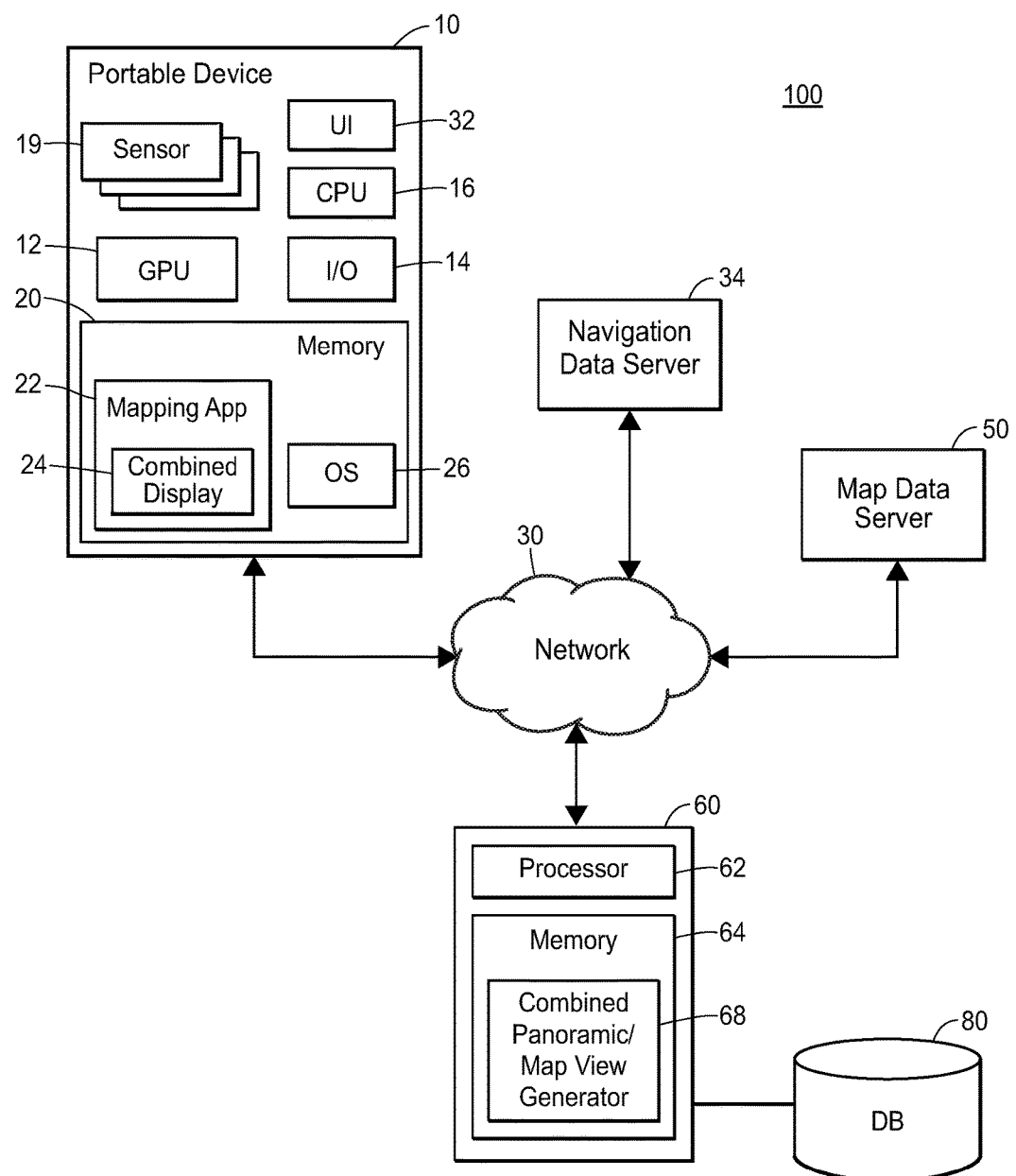
FIG. 1 is a block diagram of an example system in which techniques for providing a combined panoramic/map display to a portable device can be implemented.

To initially orient a user within a map display, a portable device displays a panoramic 3D view of a geographic area including the user's current location. The panoramic view is oriented according to the user's current orientation and displayed at the bottom of a display screen on the portable device, so that the panoramic view appears closest to the user. Moreover, the portable device simultaneously displays a non-panoramic map representation of a geographic area which is contiguous with the geographic area in the panoramic view. The non-panoramic map representation is displayed at the top of the display screen just above the panoramic view, so that the geographic area included in the map representation appears to be farther away from the user than the geographic area included in the panoramic view. In some embodiments, the representation of the sky in the panoramic view is removed and replaced by the map representation.

Additionally, when the user requests navigation directions from her current location to a destination, the panoramic view and the non-panoramic map representation are overlaid with indications of the route according to the navigation directions. In some embodiments, both the panoramic view and the map representation may be annotated with route overlays on each of the streets which correspond to maneuvers in the navigation directions, so that the user may follow the path provided by the route overlays to travel from her current location to the destination.

For example, the user may request walking directions from her current location at Key Arena in Seattle, Wash. to the Space Needle. If the user is just south of Key Arena on Thomas Street and faces east, the portable device may display a panoramic view of a geographic area having a 50 meter radius which includes Key Arena in the lower left portion of the screen, Thomas Street from the user's current location to 50 meters east of the user's current location in the lower middle, and buildings just south of Thomas Street in the lower right. Just above the panoramic view, the portable device may display a non-panoramic map representation of a geographic area including the location 50 meters east on Thomas Street from the user's current location and including the Space Needle with a pin at the Space Needle. The panoramic view may include a route overlay highlighting portions of roads included in the navigation directions. For example, the panoramic view may include a route overlay on Thomas Street heading east, and the non-panoramic map representation may include the route overlay extended down Thomas Street heading further east, followed by another route overlay indicating a right turn before arriving at the Space Needle.

In this manner, the user is immediately oriented when provided with the navigation directions, so that she knows to head in the direction she is currently facing to reach her destination. In another scenario, if the user faces northeast, the route overlay on Thomas Street may appear at a diagonal to the right on the display screen. As a result, the user may recognize that she must turn to the right to head in the proper direction for reaching her destination.

As used herein, a "panoramic view" may refer to a photorealistic representation of geolocated imagery including real-world objects which may be viewed by a user from a particular geographic location, such as a street level view of the user's surroundings from the user's current location to simulate the experience of walking down a street and exploring the neighborhood. The panoramic view may be captured using specialized equipment such as a high-resolution camera with a wide-angle lens or fish eye lens and/or image sensors such as LIDAR (Light Detection and Ranging) sensors to detect depth. Several photographs of geolocated imagery captured by the camera or by several cameras having narrow lenses may then be stitched together to generate the panoramic view. The panoramic view may be rendered onto a surface of a virtual cylinder to simulate the feeling that a user is in the middle of a scene, such as a rectangular cross-section of the virtual cylinder or onto any other surface of a three-dimensional solid centered around the perspective of the user. In another example, the panoramic view may include a three-dimensional rendering of real-world buildings, trees, signs, and other objects located within the geographic area represented by the panoramic view. Furthermore, the panoramic view may include any combination of photographs projected onto a virtual cylinder and three-dimensional renderings of real-world objects located within the geographic area. The panoramic view may be displayed from the perspective of a virtual camera.

Also as used herein, a "map representation" may refer to a non-panoramic road-map or satellite representation of map features, such as roads, cities, states, physical features, labels, etc., for a geographic area. The map representation may include a rendering of the map features in a two-dimensional plane using a Mercator projection. In another example, the map representation may include aerial photographs of the geographic area from a satellite which may be stitched together and rendered in a two-dimensional plane. Moreover, the two-dimensional plane may be parallel to the plane of the virtual camera or may be pitched (tilted) relative to the plane of the virtual camera.

As used herein, "simultaneously" displaying a panoramic view and a non-panoramic map representation may refer to displaying the panoramic view and the non-panoramic map representation concurrently as opposed to sequentially. The panoramic view and the non-panoramic map representation may be referred to as displayed "simultaneously" when the panoramic view and the non-panoramic map representation are displayed at the same time within the same screen, in the same window, etc.

Thus, the panoramic view and the non-panoramic map representation may be "simultaneously" displayed such that the panoramic view is rendered onto the surface of a virtual cylinder, while the non-panoramic map representation is rendered onto a plane parallel to the surface of the virtual cylinder or at an angle relative to the surface of the virtual cylinder based on the amount that the plane is tilted. Additionally, the panoramic view and the non-panoramic view may be "simultaneously" displayed using any suitable combination of renderings for the panoramic view and the non-panoramic map representation. For example, the panoramic view may be rendered onto the surface of a virtual cylinder and the non-panoramic map representation may be rendered onto a two-dimensional plane parallel to the surface of the virtual cylinder, the panoramic view may include a three-dimensional rendering of real-world objects and the non-panoramic map representation may be rendered onto a two-dimensional plane which is pitched relative to the plane of the virtual camera, etc.

Example Hardware and Software Components

Referring to FIG. 1, an example communication system 100 in which the techniques outlined above can be implemented includes a portable device 10, such as a portable device configured to execute a mapping application 22. In addition to the portable device 10, the communication system includes a server device 60 configured to provide a combined panoramic/map display to the portable device 10. The server device 60 can be communicatively coupled to a database 80 that stores, in an example implementation, panoramic views for various geographic areas. For example, the panoramic views may correspond to various geographic locations and depict a geographic area of a particular radius (e.g., 10 meters, 50 meters, 100 meters, etc.) around the various geographic locations. Each panoramic view may be from the perspective of a virtual camera having a particular view frustum. The view frustum may correspond to a camera location in three dimensions (e.g., the user's current location), a zoom level, and camera orientation parameters such as pitch, yaw, roll, etc., or camera azimuth, camera tilt, for example.

More generally, the server device 60 can communicate with one or several databases that store any type of suitable geospatial information or information that can be linked to a geographic context, such as coupons or offers. The communication system 100 also can include a navigation data server 34 that provides driving, walking, biking, or public transit directions, for example. Further, the communication system 100 can include a map data server 50 that provides map data to the server device 60 for generating the combined panoramic/map display. The device operating in the communication system 100 can be interconnected via a communication network 30.

In an example implementation, the portable device 10 may be a smart phone or a tablet computer, for example, and includes a memory 20, one or more processors (CPUs) 16, a graphics processing unit (GPU) 12, an I/O module 14, a user interface (UI) 32 and one or several sensors 19. The memory 20 can be a non-transitory memory and can include one or several suitable memory modules, such as random access memory (RAM), read-only memory (ROM), flash memory, other types of persistent memory, etc. The I/O module 14 may be a touch screen, for example. More generally, the techniques of this disclosure can be implemented in other types of devices, such as laptop or desktop computers, a device embedded in a vehicle such as a vehicle head unit, wearable devices, such as smart watches or smart glasses, etc.

Depending on the implementation, the one or more sensors 19 can include a global positioning system (GPS) module to detect the position of the portable device 10, a compass to determine the direction of the portable device 10, a gyroscope to determine the rotation and tilt, an accelerometer, etc.

The memory 20 stores an operating system (OS) 26, which can be any type of suitable mobile or general-purpose operating system. The OS 26 can include application programming interface (API) functions that allow applications (such as the mapping application 22) to retrieve sensor readings. For example, a software application configured to execute on the portable device 10 can include instructions that invoke an OS 26 API for retrieving a current location and orientation of the portable device 10 at that instant. The API can also return a quantitative indication of how certain the API is of the estimate (e.g., as a percentage).

The memory 20 also stores the mapping application 22, which is configured to generate interactive digital maps. The mapping application 22 can receive map data in a raster (e.g., bitmap) or non-raster (e.g., vector graphics) format from the map data server 50 and/or the server device 60. In some cases, the map data can be organized into layers, such as a basic layer depicting roads, streets, natural formations, etc., a traffic layer depicting current traffic conditions, a weather layer depicting current weather conditions, a navigation layer depicting a path to reach a destination, etc. The mapping application 22 also can display driving, walking, or transit directions, and in general provide functions related to geography, geolocation, navigation, etc.

It is noted that although FIG. 1 illustrates the mapping application 22 as a standalone application, the functionality of the mapping application 22 also can be provided in the form of an online service accessible via a web browser executing on the portable device 10, as a plug-in or extension for another software application executing on the portable device 10, etc. The mapping application 22 generally can be provided in different versions for different respective operating systems. For example, the maker of the portable device 10 can provide a Software Development Kit (SDK) including the mapping application 22 for the Android™ platform, another SDK for the iOS™ platform, etc.

In some implementations, the server device 60 includes one or more processors 62 and a memory 64. The memory 64 may be tangible, non-transitory memory and may include any types of suitable memory modules, including random access memory (RAM), read-only memory (ROM), flash memory, other types of persistent memory, etc. The memory 64 stores instructions executable on the processors 62 that make up a combined panoramic/map view generator 68, which can generate combined panoramic/map displays to be displayed by the mapping application 22 for a geographic area. The memory 64, or the memory in another server, similarly can store instructions that generate navigation directions to a geographic location within the geographic area and which may be displayed overlaying the combined panoramic/map display by the mapping application 22.

For simplicity, FIG. 1 illustrates the server device 60 as only one instance of a server. However, the server device 60 according to some implementations includes a group of one or more server devices, each equipped with one or more processors and capable of operating independently of the other server devices. Server devices operating in such a group can process requests from the portable device 10 individually (e.g., based on availability), in a distributed manner where one operation associated with processing a request is performed on one server device while another operation associated with processing the same request is performed on another server device, or according to any other suitable technique. For the purposes of this discussion, the term "server device" may refer to an individual server device or to a group of two or more server devices.

In operation, the mapping application 22 operating in the portable device 10 sends data to the server device 60. Thus, in one example, the server device 60 can receive a request for map data for a geographic area including a geographic location, such as the current location of the user. The server device 60 may also receive an indication of the current orientation of the portable device. In response, the server device 60 may retrieve a panoramic view (e.g., from the database 80) of a first portion of the geographic area from the perspective of the user's current location extending a predetermined distance (e.g., 10 meters, 50 meters, 100 meters, etc.) in a particular direction. For example, the panoramic view may be oriented in accordance with the user's current orientation. The server device 60 may also retrieve a map representation (e.g., from the map data server 50) for a second portion of the geographic area contiguous with the first portion, such as an area beginning 10 meters away from the user's current location in the same direction as the panoramic view and extending out several meters, kilometers, etc. Accordingly, the server device 60 may combine the panoramic view with the map representation and provide the combined panoramic/map display to the portable device 10.

Figure 3A:
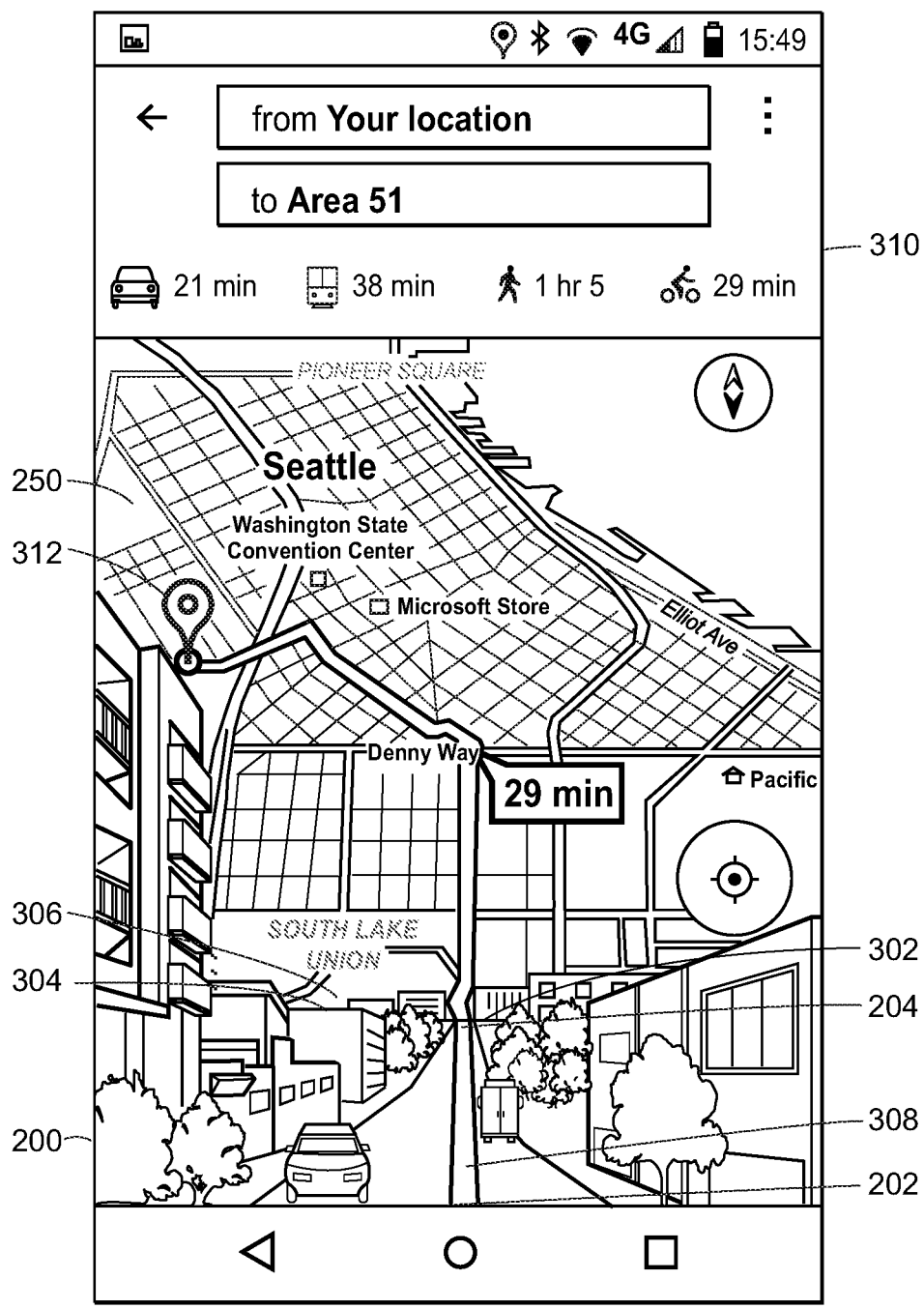
FIG. 3A is an exemplary combined panoramic/map display based on the panoramic view of FIG. 2A and the map representation of FIG. 2B including overlaid navigation directions.

The server device 60 can combine the panoramic view with the map representation in several ways. For example, the server device 60 may identify a portion of the panoramic view which represents the sky and filter out or mask this portion. The server device 60 may then replace the filtered-out portion with the map representation. This may require scaling the map representation or removing sections of the map representation so that the map representation fits within the boundaries of the sky. Also, in some embodiments, the panoramic view may be scaled so that objects in the panoramic view only take up a small portion of the display, as shown in FIG. 3A and as described in more detail below. Additionally, the map representation may be oriented in accordance with the orientation of the user. For example, if the user faces south the panoramic view may be oriented so that buildings, streets, and other objects south of the user's current location are displayed. The map representation may be oriented so that the top of the map representation is the southernmost portion of the map representation and the bottom is the northernmost portion. The server device 60 may then transmit the combined panoramic/map display to the portable device 10, and a combined display 24 implemented in the mapping application 22 of the portable device 10 may cause the combined panoramic/map display to be presented on the user interface 32 of the portable device 10.

In another implementation, the combined panoramic/map display may be composed on the portable device 10 rather than the server 60. For example, the combined panoramic/map view generator 68 on the server device 60 may transmit map data corresponding to the map representation and panorama data corresponding to the panoramic view to the portable device 10. The combined display 24 may then render the combined panoramic/map display based on the received map data and panorama data. In yet other embodiments, the combined panoramic/map display may be composed using some combination of the portable device 10 and the server device 60.

Figure 2A:
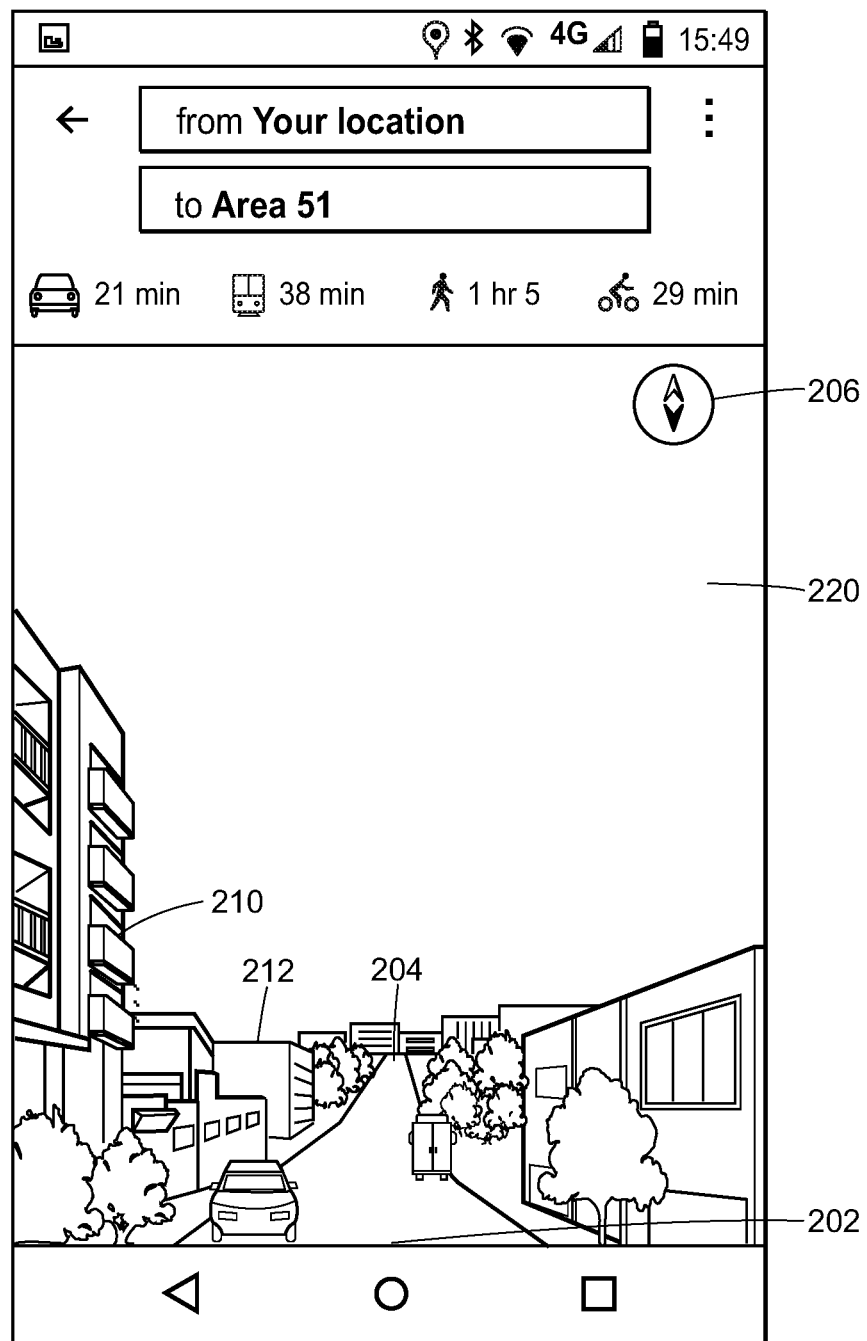
FIG. 2A is an exemplary display of a panoramic view.
Figure 2B:
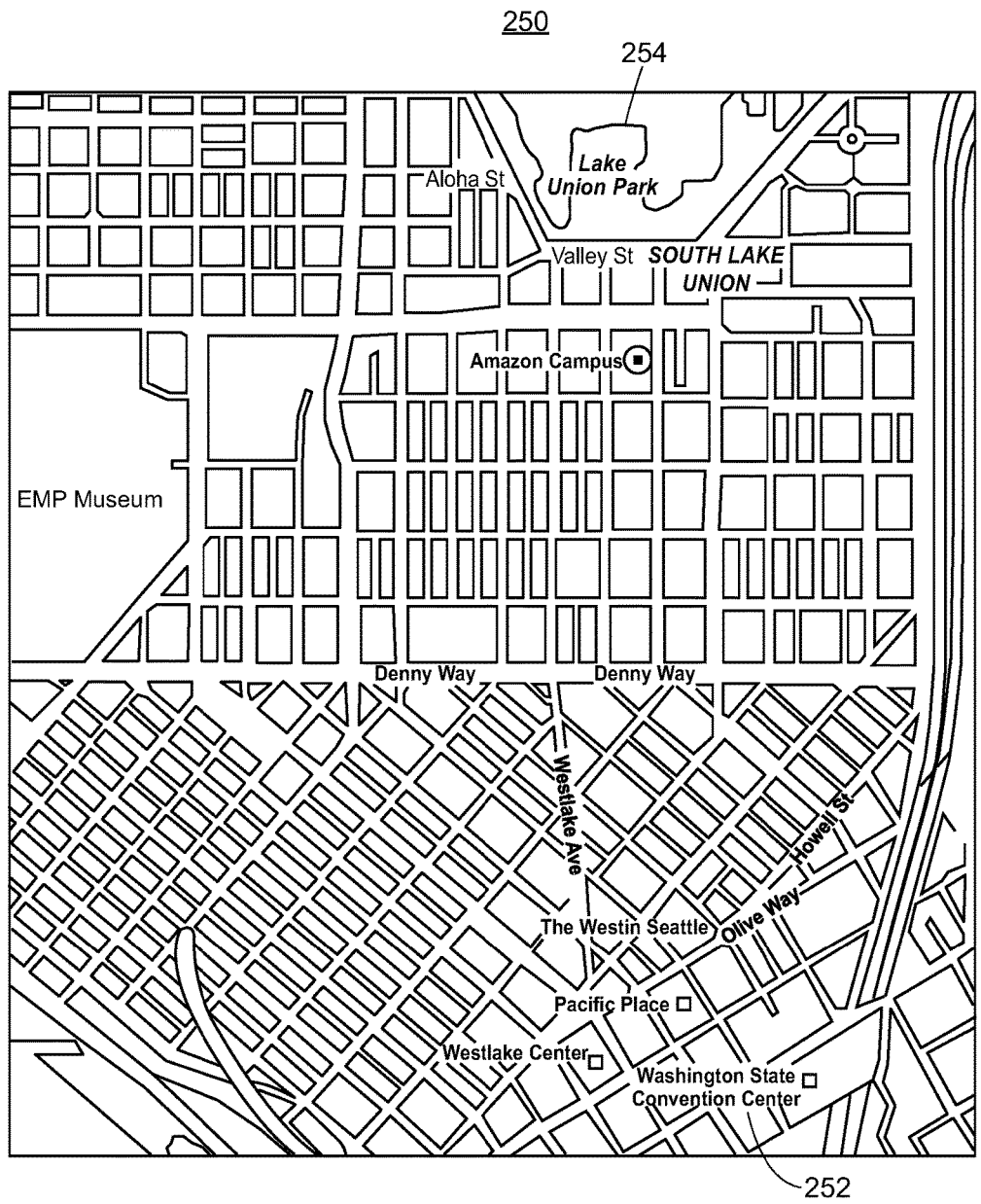
FIG. 2B is an exemplary display of a map representation.

For further clarity, FIGS. 2A and 2B illustrate a panoramic view and a map representation, respectively, which may be arranged together into a composition to generate a combined panoramic/map display as shown in FIG. 3A and as described in more detail below. With reference to the communication system 100 in FIG. 1, the combined panoramic/map view generator 68 may retrieve the panoramic view 200 as shown in FIG. 2A from the database 80. For example, the database 80 may store several panoramic views for several geographic areas. In one example scenario, the panoramic view 200 may depict part of a neighborhood in Seattle where the location of the virtual camera is the user's current location 202 and extend a threshold distance (e.g., 10 meters, 50 meters, 100 meters, etc.) in the direction the user is currently facing, which is south according to the compass 206 in the upper right corner of the panoramic view 200, to another location 204. In some embodiments, the predetermined threshold distance may be the distance from the camera location to the horizon in the real-world view. In other scenarios, the panoramic view may be from the perspective of another starting location specified by the user or selected in any other suitable manner and may extend any suitable distance in the current orientation of the user, an orientation in which the user is likely to face at the starting location, or any other suitable location. For example, if the starting location is a train station, the orientation of the panoramic view may be the orientation users are likely to face when walking out of the station.

As in the panoramic view 200, buildings, streets, and other objects which are displayed close to the bottom of the screen appear closer to the starting location 202 than buildings, streets, and other objects displayed higher up on the screen. Moreover, smaller objects appear farther away from the starting location 202 than larger objects. For example, a first building 210 appears closer to the starting location 202 of the panoramic view than a second building 212, because the second building 212 is smaller than the first building 210 and begins at a pixel location higher up on the screen than the first building 210. The panoramic view 200 may include several pixels each having a set of pixel coordinates (e.g., x, y coordinates) representing a location of the pixel relative to the other pixels within the panoramic view 200. For example, the pixels farthest to the left on the panoramic view may have pixel coordinates where the x-coordinate is 0, and the pixels at the bottom of the panoramic view may have pixel coordinates where the y-coordinate is 0. In some embodiments, a pixel located in the lower left corner of the panoramic view 200 may have pixel coordinates (0, 0) and a pixel located in the upper right corner of the panoramic view 200 may have pixel coordinates where the x-coordinate is the pixel width of the panoramic view 200 and the y-coordinate is the pixel height of the panoramic view 200 (width, height). A pixel location for a pixel may correspond to the pixel coordinate position within the panoramic view 200. Further, each set of pixel coordinates in the panoramic view 200 may correspond to a set of geographic coordinates (e.g., a latitude, longitude, and altitude). For example, starting location 202 may correspond to pixel coordinate X which maps to geographic coordinate Y and location 204 may correspond to pixel coordinate W which maps to geographic coordinate Z.

By replacing the sky 220 depicted in the panoramic view 200 with a map representation, such as the map representation 250 as shown in FIG. 2B, locations, streets, and POIs displayed in the map representation appear farther away from the user than buildings, streets, and other objects displayed in the panoramic view 200, because the sky is above the buildings, streets, and other objects. Also, indications of the locations and POIs in the map representation 250 are typically smaller than the buildings, streets, and other objects in the panoramic view 200. Therefore, replacing the sky 220 depicted in the panoramic view 200 with a map representation creates an appearance of depth, such that the user identifies objects in the panoramic view 200 as being closer to the starting location 202 than locations and POIs in the map representation.

Moreover, by replacing the sky 220 with the map representation 250, the combined panoramic/map view generator 68 also reduces the amount of unused space on the display and allows for the user to see farther off in the distance than the horizon of the panoramic view. For example, if the panoramic view 200 extends 100 meters to the south and the map representation 250 extends three more kilometers south, the user may view 3.1 kilometers south of the starting location 202 as opposed to 100 meters while maintaining the advantages of a panoramic view (e.g., similarity to real-world view, 3D objects, etc.).

To identify the portion of the panoramic view 200 which represents the sky 220, the combined panoramic/map view generator 68 may retrieve pixels from the top of the panoramic view 200 which are likely to represent the sky and compare attributes of the retrieved pixels to attributes of each of the pixels on the panoramic view. In some embodiments, the comparison may be performed with sample pixels which represented the sky in previous images. If attributes of the sample pixels (e.g., an RGB pixel value) differ from the attributes of a pixel in the panoramic view 200 by less than a predetermined threshold, the pixel in the panoramic view may be identified as a representation of the sky and may be filtered out. In some embodiments, pixels remain in the panoramic view 200 if they are directly below pixels which are not identified as representations of the sky. For example, blue pixels which depict objects on the ground may remain in the panoramic view 200 because pixels which depict buildings, trees, etc., may be located in between the blue pixels which depict objects on the ground and pixels which depict the sky and are rendered in different colors which do not match with the sky.

In another embodiment, the server device 60 may retrieve sky classifiers containing several characteristics used to identify pixels which represent the sky. Based on the sky classifiers, the server device 60 may identify and remove the portion of the panoramic view 200 which represents the sky 220 using statistical inference or any other suitable statistical methods. Various classification systems such as support vector machines, neural networks, naïve Bayes, random forests, etc. may be utilized. The filtering process may be performed using a spatial-chromatic heuristic algorithm, using machine learning techniques to compare pixels in the panoramic view to sample pixels, or in any other suitable manner.

Turning now to FIG. 2B, a map representation 250 of a portion of Seattle is shown. In some embodiments, the combined panoramic/map view generator 68 may retrieve the map representation 250 from the map data server 50. In other embodiments, the combined panoramic/map view generator 68 may retrieve map data from the map data server 50 corresponding to the portion of Seattle and may render the map representation 250 based on the map data. In yet other embodiments, the combined panoramic/map view generator 68 may retrieve map data from the map data server 50 corresponding to the portion of Seattle, manipulate the map data to generate the combined panoramic/map display and transmit the manipulated map data to the portable device 10 for rendering the map representation 250.

In any event, the combined panoramic/map view generator 68 may retrieve the map data for a geographic area including the boundary farthest from the starting location 202 in the panoramic view 200 and extending a predetermined threshold distance (e.g., one kilometer, five kilometers, ten kilometers, etc.) in the orientation of the panoramic view 200. In the example above, the combined panoramic/map view generator 68 may retrieve map data for a geographic area including location 204 having geographic coordinate Z and including locations five kilometers south of geographic coordinate Z. In another example, the user may select a destination or other POI. In response, the combined panoramic/map view generator 68 may retrieve map data for a geographic area including location 204 and including the selected destination or POI.

The panoramic/map view generator 68 may then rotate the map representation so that the map representation is oriented in accordance with the user's current orientation, similar to the panoramic view. For example, while the map representation 250 is oriented so that the top of the map representation 250 is the furthest north, the map representation 250 may be rotated 180 degrees so that the top of the map representation 250 is the furthest south as in the panoramic view 200. Labels and other map features in the map representation 250 may also be rotated in a similar manner. As a result, the Washington State Convention Center 252 may appear near the top of the map representation 250 and Lake Union Park 254 may appear near the bottom of the map representation 250. In other scenarios, when the panoramic view 200 faces east, the map representation may be rotated 90 degrees so that the top of the map representation 250 is the farthest east, when the panoramic view faces northeast, the map representation 250 may be rotated 45 degrees so that the top of the map representation 250 is the furthest northeast, when the panoramic view 200 faces north, the map representation 250 is not rotated, etc.

Additionally, the geometry of the map representation 250 may be altered to match the geometry of the empty space in the panoramic view 200 when the sky 220 is removed. In some embodiments, the empty space may be rectangular similar to the shape of the map representation 250, yet in another embodiments, as in the panoramic view 200 the empty space may be irregularly shaped. In this case, after rotating the map representation 250 in accordance with the orientation of the panoramic view 200, the combined panoramic/map view generator 68 may remove portions of the map representation 250 which do not fit within the geometry of the empty space. For example, the combined panoramic/map view generator 68 may compare a pixel array of pixel coordinates which correspond to the empty space to a pixel array of pixel coordinates which correspond to the map representation 250. Pixels in the map representation 250 may be removed when the pixels correspond to pixel coordinates that are not included in the pixel array which represents the empty space.

Additionally, the map representation 250 may be scaled in any suitable manner. For example, if the user selects a POI 500 kilometers southwest of the starting location 202, the map representation may 250 may be displayed at a very low level of detail to include location 204 and the selected POI within the boundaries specified by the pixel array for the empty space. On the other hand, if the user selects a POI 1 kilometer south of the starting location 202, the map representation 250 may be displayed at a very high level of detail. Also in some embodiments, the level of detail may be adjusted via user input as described in more detail below with reference to FIG. 3E.

In any event, the combined panoramic/map view generator 68 may place the altered and rotated map representation 250 in the empty space of the panoramic view 200 to generate a combined panoramic/map display. For example, FIG. 3A illustrates a combined panoramic/map display 300 including the panoramic view 200 and the altered and rotated map representation 250. The combined panoramic/map display 300 also includes an intersection 302 between the panoramic view 200 and the map representation 250. The intersection 302 occurs at a common geographic boundary shared between the panoramic view 200 and the map representation 250. As mentioned above, location 204 may correspond to geographic coordinate Z. At the intersection 302, locations in the map representation 250 may also correspond to geographic coordinate Z. In some embodiments, locations at the intersection 302 may have different altitudes. For example, the top of building 304 may be at the same latitude and longitude as its adjacent location 306 in the map representation 250. However, the top of building 304 may have an altitude several meters above street level, whereas the adjacent location 306 may have an altitude at street level. As a result, the combined panoramic/map view generator 68 may display locations in the panoramic view 200 and in the map representation 250 at the intersection 302 which have the same geographic coordinates according to their latitudes and longitudes.

Further, a user may request navigation directions to a destination which may be displayed overlaying the panoramic view 200 and the map representation 250. For example, the user may request navigation directions to the Area 51 furniture store in Seattle. As a result, an indication 312 may be displayed on the map representation 250 at Area 51, such as a pin. Moreover, the combined panoramic/map view generator 68 may retrieve a set of navigation directions from the starting location 202 (which may be the user's current location) to Area 51. The set of navigation directions may include several maneuvers, such as "Head South down Main Street," Turn right on Lake Avenue," "Merge onto Highway 54," etc.

For each maneuver in the set of navigation directions, the combined panoramic/map view generator 68 determines whether the maneuver corresponds to locations displayed in the panoramic view 200, locations displayed in the map representation 250, or a combination of both. When the maneuver corresponds to locations displayed in the panoramic view 200, the combined panoramic/map view generator 68 generates a first route indication which is overlaid on the corresponding streets depicted in the panoramic view 200. For example, the indication may be a route overlay highlighting the portion of the street in the panoramic view 200 which the user is directed to travel along. The route overlay may be rectangular having the length and width as the portion of the street that the route overlay highlights. Additionally, the route overlay may be displayed in a bright color or may have thicker lines than the buildings, streets, and other objects in the panoramic view 200 to direct a user's attention to the route overlay. However, this is merely one example of an indication representing the route and an indication of the route may be represented by arrows, colors, labels, or in any suitable manner. Moreover, the route overlay may include any suitable shape, length, width, and/or color which causes the route overlay to highlight the corresponding portion of the street in the panoramic view 200.

Similarly, when the maneuver corresponds to locations displayed in the map representation, the combined panoramic/map view generator 68 generates a second route indication which may also be a route overlay that is overlaid on the corresponding streets depicted in the map representation 250. When the maneuver corresponds to locations displayed in both the panoramic view 200 and the map representation 250, the maneuver may be divided into a portion corresponding to locations displayed in the panoramic view 200 and a portion corresponding to locations displayed in the map representation 250. The combined panoramic/map view generator 68 generates a first route indication which is overlaid on the corresponding streets depicted in the panoramic view 200 for the portion of the maneuver which corresponds to the panoramic view 200 and a second route indication which is overlaid on the corresponding streets depicted in the map representation 250 for the portion of the maneuver which corresponds to the map representation. As a result, the combined panoramic/map display 300 displays an indication of the entire route 308 from the starting location 202 to Area 51 (reference 312). In some embodiments, a text description for each of the maneuvers may be included on the combined panoramic/map display 300. For example, the text description may be included over a portion of the map representation 250 which does not display the route 308.

By overlaying indications of the route on the combined panoramic/map display 300, a user may easily recognize the proper direction in which to travel to reach his destination. In the example route 308, the user is able to identify that he should continue travelling in the direction he is currently facing to reach Area 51. If for example, a first route indication included a diagonal route overlay as opposed to the vertical route overlay in the combined panoramic/map display 300, the user would realize he needs to make a turn based on the difference in the direction he is facing and the direction of the route overlay.

Figure 3B:
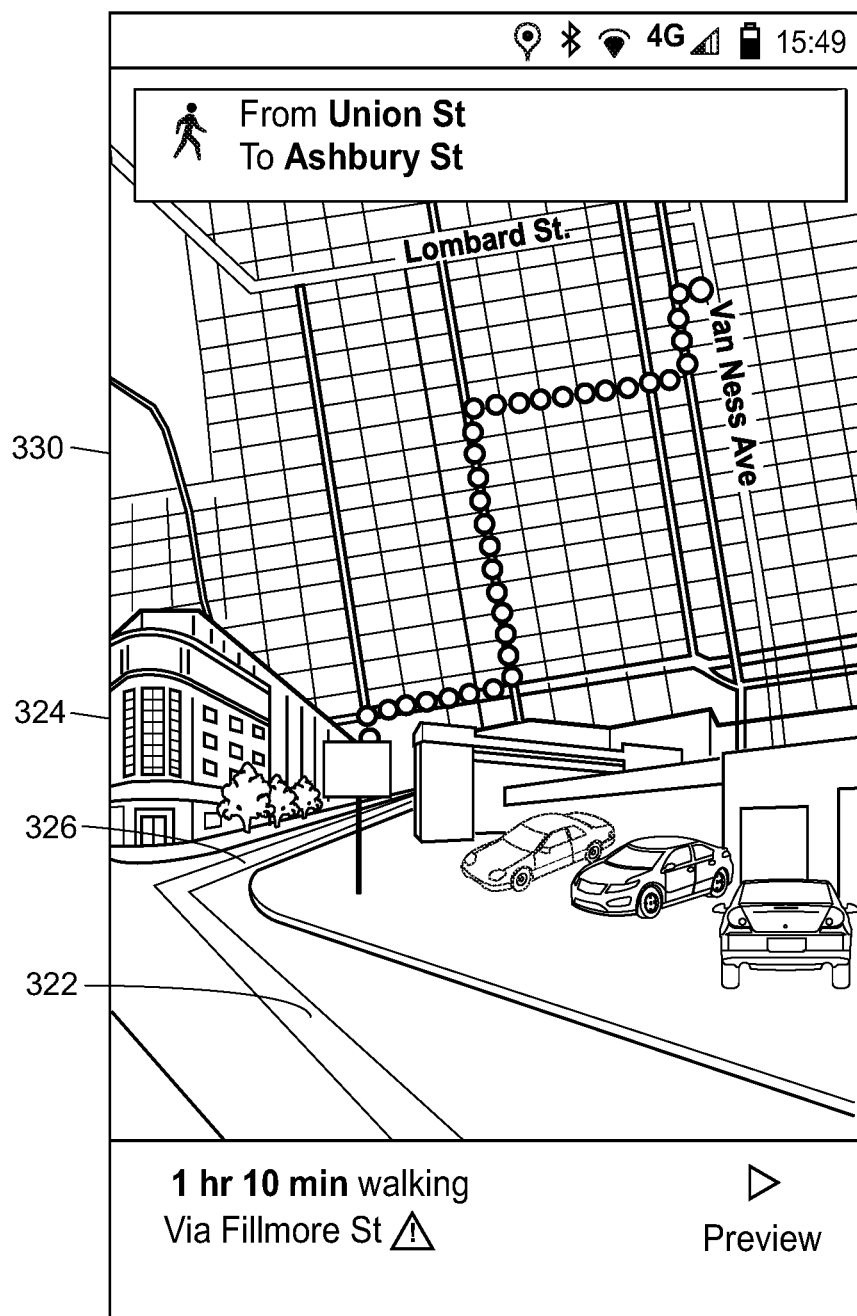
FIG. 3B is another exemplary combined panoramic/map display including overlaid navigation directions.

For example, the combined panoramic/map display 320 as shown in FIG. 3B is annotated with a route that begins with a first maneuver displayed by a first route overlay 322 that is on a diagonal to the left. Based on this indication, the user is directed to turn slightly to the left. To ensure the user does not turn too far or too little to the left to match the orientation of the route overlay 322, the combined panoramic/map view generator 68 may update the combined panoramic/map display 320 based on the user's current location and orientation. For example, if the user turns the correct amount to the left, the updated display may include an indication of a first maneuver which is a vertical route overlay indicating that the user should proceed straight ahead. On the other hand, if the user turns too far to the left, the indication of the first maneuver in the updated display may be on a diagonal to the right. In some embodiments, the combined panoramic/map display 320 is updated each time the user's current location or orientation changes to display a view from the user's most recent location and orientation. In other embodiments, the combined panoramic/map display 320 is updated periodically (e.g., every minute, every two minutes, every five minutes, etc.) or based on an indication that the user is lost or unsure of where he is. For example, if the user pauses for more than a threshold period of time (e.g., 15 seconds, 30 seconds, a minute, etc.) or shakes the portable device 10 as detected by the accelerometer, the combined panoramic/map display 320 may be updated.

Additionally, the panoramic view of the combined panoramic/map display 320 may include landmarks such as a building 324 which may orient the user to ensure she is properly following along the route. For example, a second maneuver displayed by a second route overlay 326 may direct the user to make a right turn at a particular location. To ensure that she is making the right turn at the appropriate location, the user may recognize that the right turn should occur just before reaching the building 324. Before making the turn, the user may verify that she is close to a building which looks like the building 324 depicted in the panoramic view.

In some embodiments, the map data and panorama data for may be generated/altered by the server device 60 and the portable device 10 may render the combined panoramic/map display 300 based on the received map and panorama data. For example, the combined display 24 in the mapping application 22 of the portable device 10 may render the combined panoramic/map display 300. In other embodiments, the server device 60 may render and provide the combined panoramic/map display 300 to the portable device 10 for display on the user interface 32. While the combined panoramic/map display 300 is combined so that the map representation 250 is displayed above the panoramic view 200, the map representation 250 and panoramic view may be combined so that they are displayed side by side, so that the map representation 250 is displayed below the panoramic view 200, or in any suitable manner.

Figure 3C:
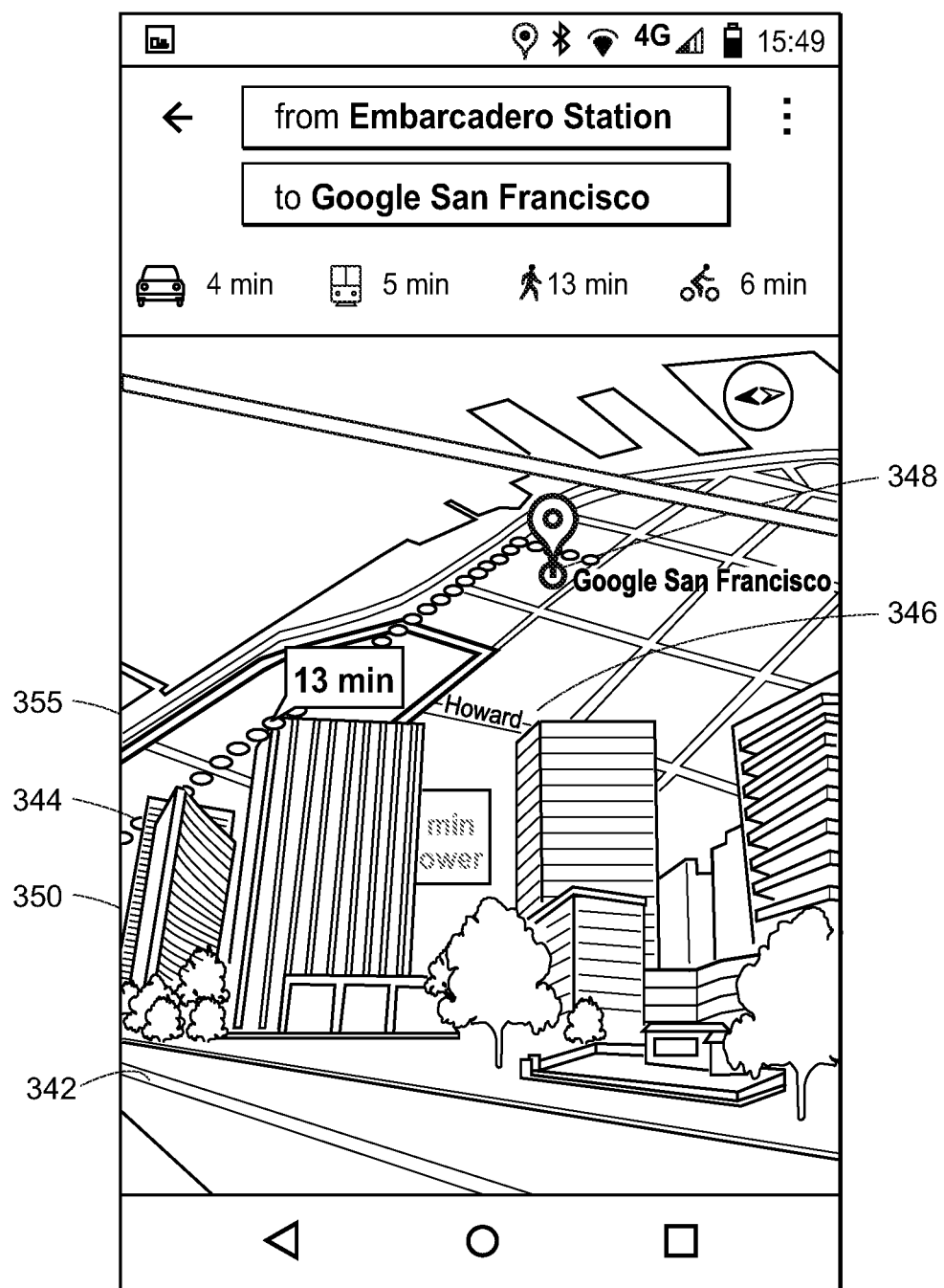
FIG. 3C is yet another exemplary combined/panoramic map display including overlaid navigation directions.

FIG. 3C illustrates yet another example of a combined panoramic/map display 340. In this exemplary display 340, the user requests navigation directions from a train station (Embarcadero Station) to Google offices in San Francisco. As a result, the panoramic view 350 and the map representation 355 may be oriented based on a user's most likely orientation when exiting the train station rather than the user's current orientation. For example, the exit from the train station may face east. In other scenarios, if the portable device 10 determines that the user's current location is Embarcadero Station, for example, then the panoramic view 350 and the map representation 355 may be oriented based on the user's current orientation. In any event, a first maneuver displayed by a first route overlay 342 in the panoramic view 350 may direct the user to turn slightly to the left and proceed down the street displayed in the panoramic view 350. A second maneuver displayed by a second route overlay 344 in the map representation 355 may direct the user to make a right turn after proceeding a certain distance down the street corresponding to the first route overlay 342.

Additionally, whereas the map representations 250, 330 in FIGS. 3A and 3B, respectively, are displayed such that locations and POIs further away from the starting locations are higher up on the map representations 250, 330, this is not completely analogous to what the user sees in the real-world. From the perspective of a user, locations and POIs which are far away appear off in the distance as opposed to above the user's line of sight. To provide depth perception to the user for the map representation 355 portion of the combined panoramic/map display 340, the map representation 355 may be tilted so that that Google San Francisco 348, for example, appears further away than Howard Street 346. To tilt the map representation 355, the combined panoramic/map view generator 68 may alter the pitch of the map representation 355 within the view frustum of the virtual camera. In some embodiments, the map representation may be tilted using a transformation matrix. In this manner, a user may perceive depth in the panoramic view and additional depth in the map representation.

In some scenarios, a user may request map data or navigation directions which are opposite from the user's current orientation or the selected oriented for the combined panoramic/map display. For example, if the map data or the navigation directions differ from the orientation of the combined panoramic/map display by more than a predetermined threshold amount (e.g., at least 90 degrees clockwise or counter-clockwise), the map data and the navigation directions would not be viewable from the viewpoint of the combined panoramic/map display. In this scenario, the combined panoramic/map view generator 68 may identify a difference in orientation of greater than or equal to 90 degrees, and may generate an indicator directing the user to turn in the appropriate direction. The indicator is then displayed on the combined panoramic/map display.

Figure 3D:
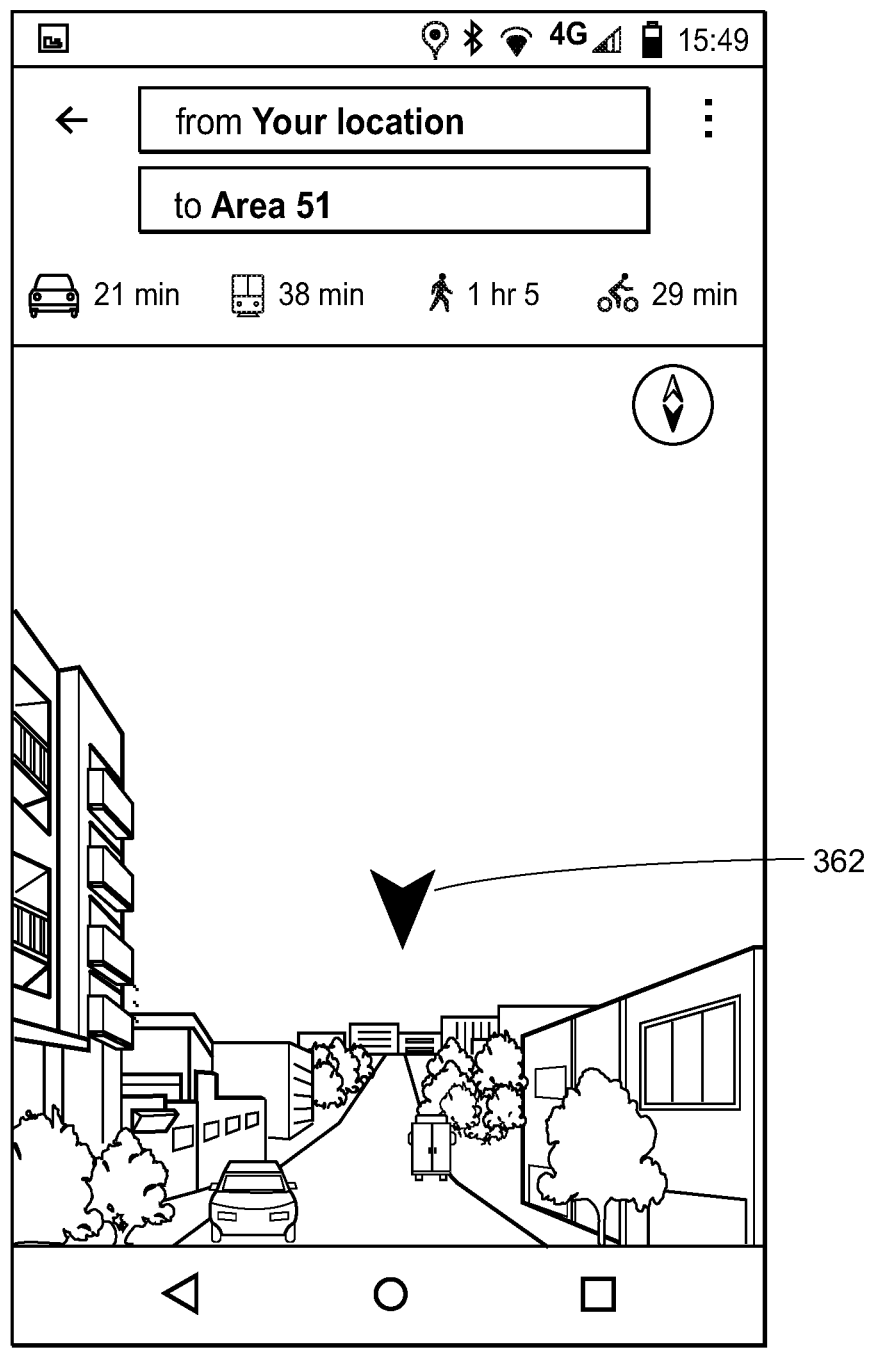
FIG. 3D is an exemplary display of a panoramic view with an indication directing the user to turn around to view navigation directions.

FIG. 3D illustrates a combined panoramic/map display 360 generated when a user requests navigation directions opposite from the user's current orientation. For example, the user may be facing south when he requests navigation directions for a destination which requires him to head north. In another example, the user may be facing south when he requests map data for a surrounding geographic area including a POI north of the user's current location. As a result, the combined panoramic/map display 360 may include an indicator 362 directing the user to turn around and face north.

The indicator 362 may be an arrow and may face downward when directing the user to turn around. Moreover, when directing the user to turn left or right, the indicator 362 may face left or right. Additionally, the indicator 362 may have any suitable orientation. For example, if the navigation directions require the user to head northeast the indicator 362 may face down and to the left; if the navigation directions require the user to head northwest the indicator 362 may face down and to the right, etc.

The combined panoramic/map display 360 also does not include a map representation, because the requested map data and navigation directions cannot be seen within the display 360 for the user's current orientation. In some embodiments, the combined panoramic/map display 360 also may not include a panoramic view until the orientation changes so that the requested map data and navigation direction can be seen within the display. In other embodiments, the combined panoramic/map display 360 may include a panoramic view and a map representation for a geographic area which corresponds to the current orientation and an indicator directing the user to turn in an appropriate direction to view the requested map data or navigation directions on the display.

While the indicator 362 is shown as an arrow in the combined panoramic/map display 360, this is merely one exemplary embodiment and the indicator 362 may be represented by a flashing arrow, text, a pointing finger, or in any other suitable manner. Furthermore, while the indicator 362 is illustrated as pointing downward, in other embodiments, the indicator 362 may point toward the user to direct him to turn around.

Figure 3E:
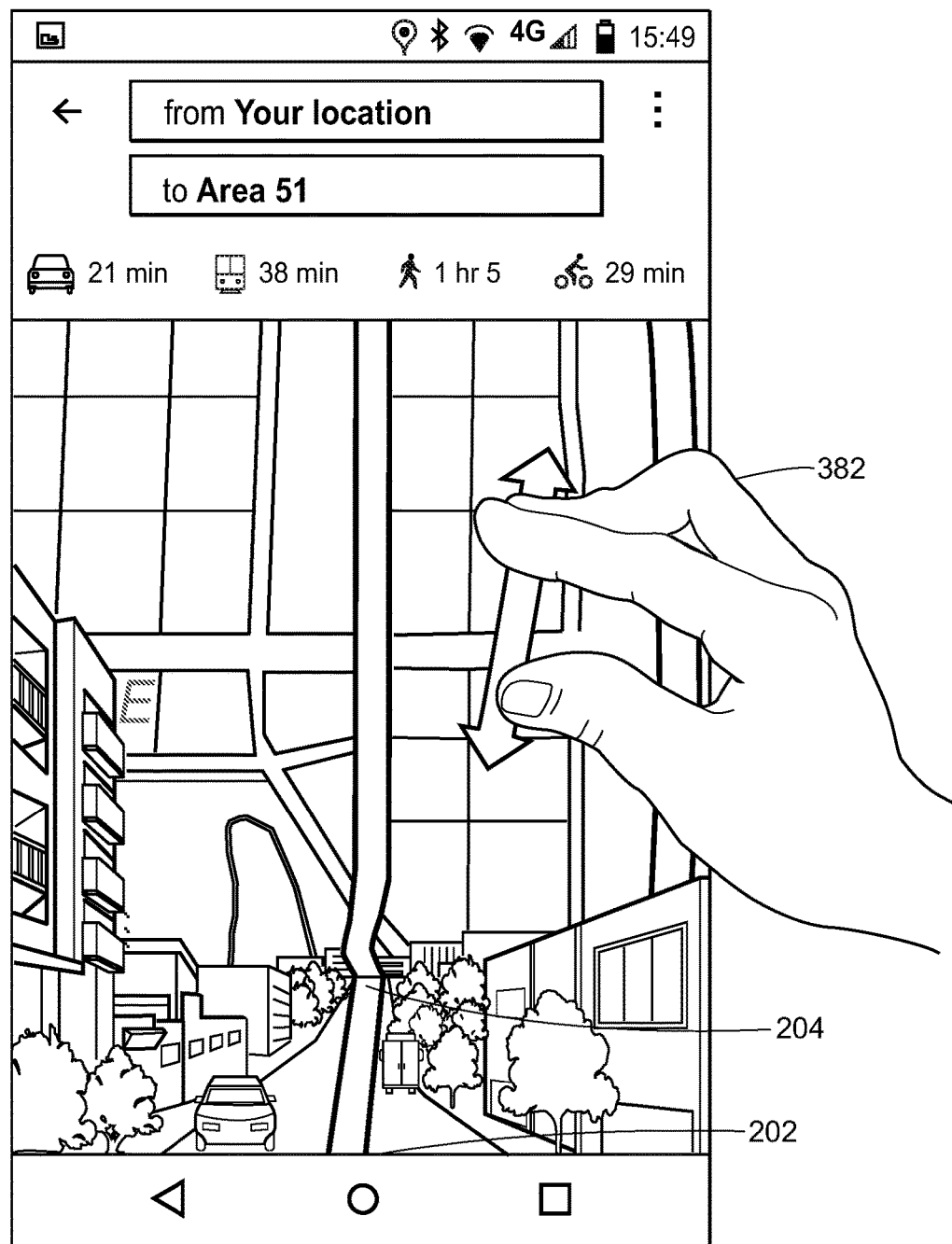
FIG. 3E is an exemplary combined panoramic/map display altered based on a user gesture.

FIG. 3E illustrates yet another combined panoramic/map display 380 which may be adjusted based on input from the user. The combined panoramic/map display 380 is similar to the combined panoramic/map display 320 as shown in FIG. 3A and includes a similar panoramic view and map representation. To adjust the zoom level of the panoramic view or map representation, the user can perform one or more gesture based actions on the touch screen of the portable device 10. For example, the user can pinch her fingers inward to zoom out and pull her fingers outward to zoom in. The user can also tap or double tap to adjust the zoom level or click on a mouse. The zoom level corresponds to map zoom levels, where a low level, e.g., level 2 may include North America and zoom level 18 may show only a few blocks or less of a city.

However, the combined panoramic/map display 380 does not allow the user to adjust the zoom level when the zoom level adjustment is centered around a location away from the route. This is to ensure that the combined panoramic/map display 380 does not pan away from the route so that the user does not get disoriented in the panoramic view or the map representation. For example, a user may perform a pinch gesture in the upper right corner of the map representation instructing the combined panoramic/map display 380 to zoom in on the upper right corner of the map representation. Rather than zooming in and panning the map representation to the geographic area displayed in the upper right corner, the combined panoramic/map display 380 zooms in on a location at the intersection between the panoramic view and the map representation.

For example, the combined panoramic/map display 380 may zoom in on location 204, ensuring that the combined panoramic/map display 380 does not move away from the locations on the requested route. In another example, a location at the intersection may be identified where the portion of the route overlaid on the panoramic view meets with the portion of the route overlaid on the map representation. This location may correspond to pixel coordinate X which maps to geographic coordinate Y. When the user adjusts the zoom level, the combined panoramic/map display 380 may be configured such that geographic coordinate Y cannot move away from pixel coordinate X on the display. Accordingly, each zoom level adjustment may be centered around the location corresponding to pixel coordinate X.

As shown in FIG. 3E, the user spreads her fingers apart (a pinch-out gesture) 382 in the upper right corner of the combined panoramic/map display 380 to zoom in. As a result, the combined panoramic/map display 380 zooms in on the map representation. However, the route remains at the center of the combined panoramic/map display 380 and is not moved off to the left as in the situation where the display 380 is zoomed and panned to the location of the user's fingers. In some embodiments, the combined panoramic/map display 380 adjusts the zoom level of the panoramic view upon receiving user input indicative of a zoom at locations on the combined panoramic/map display 380 which correspond to the panoramic view. In other embodiments, the combined panoramic/map display 380 adjusts the zoom level of the panoramic view and the map representation simultaneously upon receiving user input indicative of a zoom anywhere on the display 380.

Further, in some embodiments, the combined panoramic/map display 380 may include additional user controls. For example, the user may select an option, for example by tapping or clicking on the combined panoramic/map display 380 to hide the panoramic view or the map representation. When the panoramic view is hidden, the user may zoom and pan to various locations on the map representation by tapping, pinching, clicking, etc., as described above.

Figure 4:
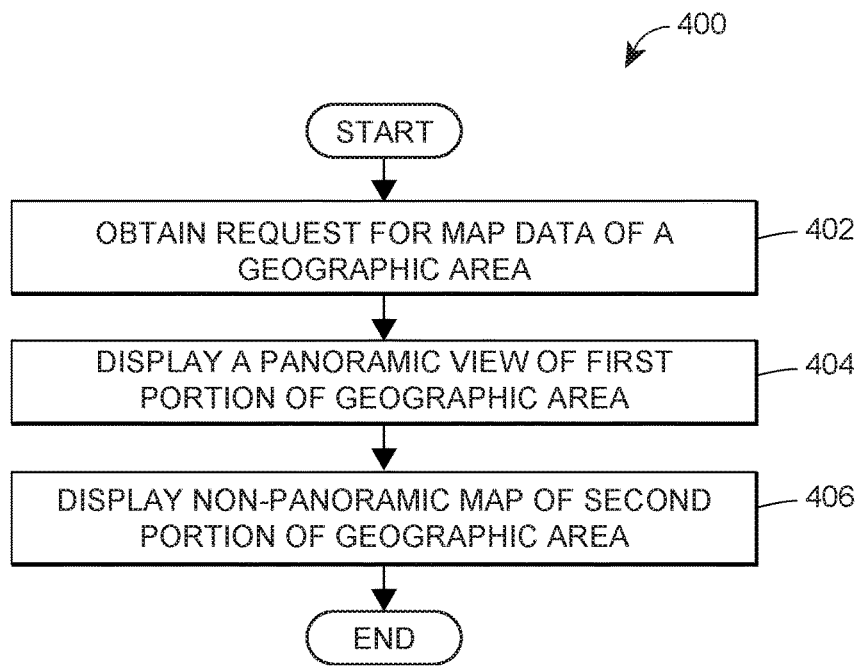
FIG. 4 is a flow diagram of an example method for displaying the combined panoramic/map display, which can be implemented in the portable device.

FIG. 4 illustrates a flow diagram of an example method 400 for displaying a combined panoramic/map display. The method can be implemented in a set of instructions stored on a computer-readable memory and executable on one or more processors of the portable device 10. For example, the method can be implemented by the mapping application 22 and more specifically, the combined display 24.

At block 402, the portable device 10 may obtain a request for map data of a geographic area. For example, the user may request to view a POI such as the nearest McDonalds restaurant, which may be interpreted as a request to view map data for a geographic area which includes the user's current location and the nearest McDonalds. In another example, the user may open the mapping application 22 and request to view her current surroundings (e.g., a geographic area which includes a three kilometer radius around the user's current location). In any event, the portable device 10 may transmit the request to the server device 60.

Accordingly, the combined panoramic/map view generator 68 in the server device 60 may obtain a panoramic view for a first portion of the requested geographic area. For example, a panoramic view may be obtained from the database 80 which displays objects which may be viewed from the perspective of the user's current location within 10 meters in the direction of McDonalds. In other embodiments, the panoramic view may extend for 50 meters, 100 meters, etc. Also in some embodiments, the panoramic view may be oriented in accordance with the portable device's current orientation. For example, if the portable device 10 faces south, the panoramic view may display objects to the south of the user's current location.

The combined panoramic/map view generator 68 may then identify the portion of the panoramic view which represents the sky and filter out this portion. In some embodiments, the panoramic view may then be transmitted to the portable device 10 and displayed on the user interface 32 (block 404). For example, the server device 60 may transmit the rendered panoramic view to the portable device 10 for display. In other embodiments, the server device 60 may transmit panorama data to the portable device 10 and the combined display 24 may render the panoramic view based on the panorama data. In any event, the panoramic view may be displayed at the bottom of the user interface 32 so that the objects in the panoramic view appear close to the user.

The combined panoramic/map view generator 68 may also generate a map representation for a second portion of the requested geographic area. The first and second portions may be non-overlapping and contiguous. For example, if the panoramic view faces south and the southern border of the panoramic view is 10 meters south of the user's current location, then the northern border of the map representation is also 10 meters south of the user's current location. The second portion may include the remaining portion of the geographic area not included in the first portion which includes everything in the geographic area that is south of 10 meters from the user's current location. The map representation may be generated based on map data retrieved from the map data server 50. Also, the map representation may be oriented in accordance with the user's current orientation, similar to the panoramic view. For example, if the map data server 50 transmits map data oriented such that the map representation faces north (e.g., the top of the map representation is the northernmost point), the combined panoramic/map view generator 68 may rotate the map representation and corresponding labels or other map features 180 degrees so that the map representation faces south (e.g., the top of the map representation is the southernmost point). The server device 60 may then transmit the map representation or the map data corresponding to the map representation to the portable device 10 for display on the user interface 32.

To display the panoramic view and the map representation in a combined panoramic/map display on the user interface 32, the combined display 24 places the map representation in the empty space where the sky used to be in the panoramic view. In some embodiments, the combined display 24 identifies the geometry left by the empty space in the panoramic view and compares this to the shape of the map representation. Portions of the map representation may be removed which do not fit within the geometry left by the empty space. The combined display 24 may then display the panoramic view and the map representation on the user interface 32 (block 406), such that the panoramic view and the map representation intersect at the boundary which is commonly shared between the panoramic view and the map representation. In the example above, the southern border of the panoramic view is the northern border of the map representation. In this example, the intersection between the panoramic view and the map representation occurs at this commonly shared border.

Figure 5:
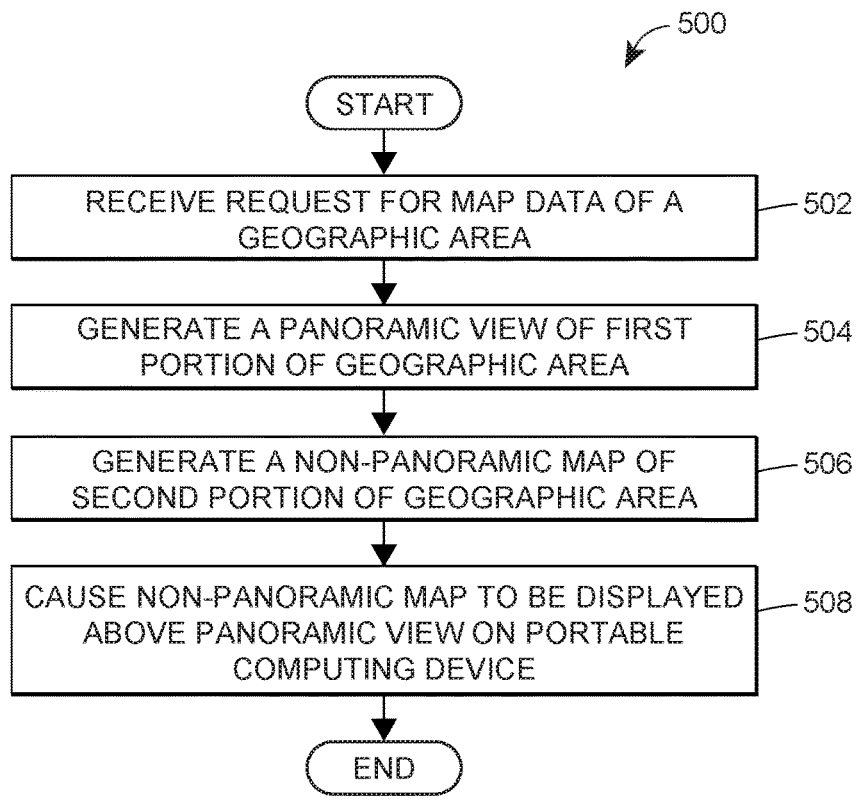
FIG. 5 is a flow diagram of an example method for generating the combined panoramic/map display, which can be implemented in the server device.

FIG. 5 illustrates a flow diagram of a method 500 for generating the combined panoramic/map display. The method can be implemented in a set of instructions stored on a computer-readable memory and executable on one or more processors of the server device 60. For example, the method can be implemented by the combined panoramic/map view generator 68.

At block 502, the server device 60 may receive a request for map data of a geographic area. For example, the geographic area may include the user's current location and a POI such as the nearest McDonalds. In another example, the geographic area may include a 500 meter radius around the user's current location. In some embodiments, the request may also include an indication of the user's current orientation or of a selected orientation for generating the combined panoramic/map display.

The combined panoramic/map view generator 68 may then obtain and/or generate a panoramic view for a first portion of the requested geographic area (block 504). For example, a panoramic view may be obtained from the database 80 which displays objects which may be viewed from the perspective of the user's current location within 10 meters in the direction of McDonalds. In other embodiments, the panoramic view may extend for 50 meters, 100 meters, etc. Also in some embodiments, the panoramic view may be oriented in accordance with the received orientation. For example, if the portable device 10 faces south, the panoramic view may display objects to the south of the user's current location.

Once the panoramic view is obtained, the portion of the panoramic view which represents the sky may be removed. For example, the combined panoramic/map view generator 68 may retrieve pixels from the top of the panoramic view which are likely to represent the sky and compare attributes of the retrieved pixels to attributes of each of the pixels on the panoramic view. In some embodiments, the comparison may be performed with sample pixels which represented the sky in previous images. If attributes of the sample pixels differ from the attributes of a pixel in the panoramic view by less than a predetermined threshold, the pixel in the panoramic view may be identified as a representation of the sky and may be filtered out. In some embodiments, pixels in the panoramic will not be removed if they are directly below pixels which are not identified as representations of the sky.

At block 506, the combined panoramic/map view generator 68 may generate a map representation for a second portion of the requested geographic area. The first and second portions may be non-overlapping and contiguous. For example, if the panoramic view faces south and the southern border of the panoramic view is 10 meters south of the user's current location, then the northern border of the map representation is also 10 meters south of the user's current location. The second portion may include the remaining portion of the geographic area not included in the first portion which includes everything in the geographic area that is south of 10 meters from the user's current location. The map representation may be generated based on map data retrieved from the map data server 50. Also, the map representation may be oriented in accordance with the user's current orientation, similar to the panoramic view. For example, if the map data server 50 transmits map data oriented such that the map representation faces north (e.g., the top of the map representation is the northernmost point), the combined panoramic/map view generator 68 may rotate the map representation and corresponding labels or other map features 180 degrees so that the map representation faces south (e.g., the top of the map representation is the southernmost point). In some embodiments, to provide depth perception to the user for the map representation, the map representation may be tilted. To tilt the map representation, the combined panoramic/map view generator 68 may alter the pitch of the map representation within the view frustum of the virtual camera. For example, the map representation may be tilted using a transformation matrix.

Furthermore, the panoramic view and the map representation may be arranged together into a composition to form a combined panoramic/map display. The panoramic view and the map representation may be arranged such that they intersect at a common geographic boundary. For example, a point (pixel) along the horizon of the panoramic view may correspond to geographic coordinate Z. In some embodiments, the point along the horizon of the panoramic view may be the point in which a route overlay converges on the panoramic view. Locations in the map representation which also correspond to geographic coordinate Z may be placed at the intersection between the panoramic view and the map representation adjacent to the point along the horizon of the panoramic view in the combined panoramic/map display. In some embodiments, the map representation may be rotated about the point along the horizon corresponding to geographic coordinate Z when orienting the map representation.

Also, the combined panoramic/map view generator 68 identifies the geometry left by the empty space in the panoramic view and compares this to the shape of the map representation. For example, the combined panoramic/map view generator 68 may generate an array of pixel coordinates which correspond to the empty space. The matching pixels in the map representation may be assigned to the bottom row of pixel coordinates in the array. The combined panoramic/map view generator 68 may then determine which remaining pixels in the map representation do not match with a set of pixel coordinates in the pixel array. Accordingly, portions of the map representation may be removed which do not fit within the geometry left by the empty space. In some embodiments, the combined panoramic/map display may be larger than the panoramic view. For example, the combined panoramic/map view generator 68 may adjust the zoom level for the panoramic view, such that the panoramic view only takes up a portion of the combined panoramic/map display. More specifically, the panoramic view may be placed at the bottom quarter of the combined panoramic/map display. The empty space previously used to represent the sky may be placed directly above the panoramic view and may take up another quarter of the combined panoramic/map display. As a result, the map representation may not only replace the portion of the panoramic view which represented the sky but may also take up the remaining portion of the combined panoramic/map display. In this manner, the map representation may display a larger geographic area or be displayed at a higher level of detail. In any event, at block 508, the combined panoramic/map view generator 68 may transmit the combined panoramic/map display to the portable device 10.

Figure 6:
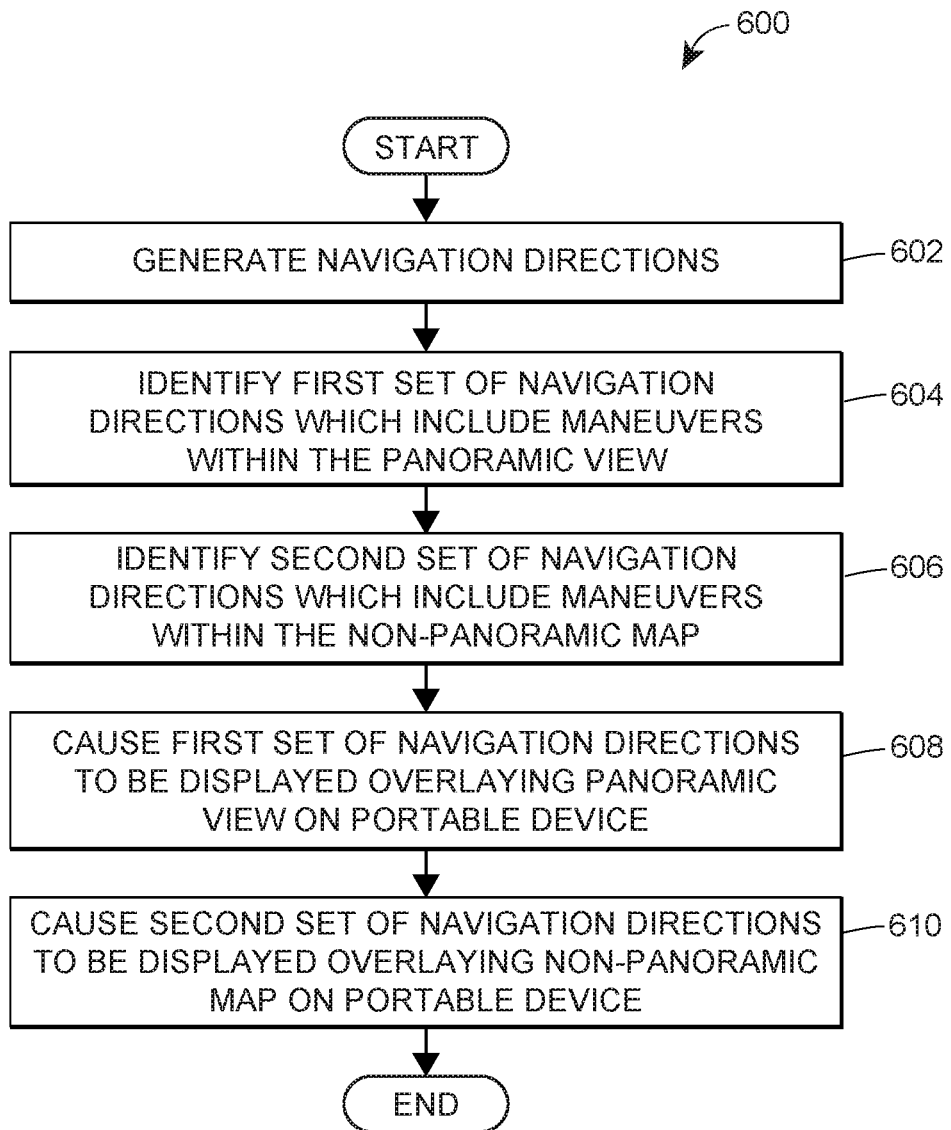
FIG. 6 is a flow diagram of an example method for generating navigation directions overlaid on the combined panoramic/map display, which can be implemented in the server device.

FIG. 6 illustrates a flow diagram of a method 600 for overlaying navigation directions on the combined panoramic/map display. The method can be implemented in a set of instructions stored on a computer-readable memory and executable on one or more processors of the server device 60. For example, the method can be implemented by the combined panoramic/map view generator 68.

At block 602, the combined panoramic/map view generator 68 may generate a set of navigation directions from a starting location (e.g., the user's current location) to a destination. For example, the set of navigation directions may be retrieved from the navigation data server 34.

The set of navigation directions may include several maneuvers, such as "Head South down Main Street," "Turn right on Lake Avenue," "Merge onto Highway 54," etc. For each maneuver in the set of navigation directions, the combined panoramic/map view generator 68 determines whether the maneuver corresponds to locations displayed in the panoramic view (block 604), locations displayed in the map representation (block 606), or a combination of both. A maneuver may correspond to locations displayed in the panoramic view when the entire maneuver occurs within the geographic area displayed by the panoramic view. For example, if the maneuver is "Head South down Thomas Street for 3 miles," and the panoramic view displays the entire 3 miles down Thomas Street, then the maneuver corresponds to locations displayed in the panoramic view. On the other hand, if the panoramic view displays 1 mile down Thomas Street and the map representation displays the additional 2 miles, then the maneuver corresponds to both the panoramic view and the map representation.

In any event, when the maneuver corresponds to locations displayed in the panoramic view, the combined panoramic/map view generator 68 generates a first route indication which is overlaid on the corresponding streets depicted in the panoramic view (block 608). For example, the indication may be a route overlay placed on the portion of the street in the panoramic view which the user is directed to travel along.

Similarly, when the maneuver corresponds to locations displayed in the map representation, the combined panoramic/map view generator 68 generates a second route indication which is overlaid on the corresponding streets depicted in the map representation (block 610). When the maneuver corresponds to locations displayed in both the panoramic view and the map representation, the maneuver may be divided into a portion corresponding to locations displayed in the panoramic view (e.g., the first mile south down Thomas Street) and a portion corresponding to locations displayed in the map representation (e.g., the additional 2 miles south down Thomas Street). The combined panoramic/map view generator 68 generates a first route indication which is overlaid on the corresponding streets depicted in the panoramic view for the portion of the maneuver which corresponds to the panoramic view and a second route indication which is overlaid on the corresponding streets depicted in the map representation for the portion of the maneuver which corresponds to the map representation. The combined panoramic/map view generator 68 may transmit the overlaid route to the portable device 10 for display.

Additional Considerations

The following additional considerations apply to the foregoing discussion. Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter of the present disclosure.

Additionally, certain embodiments are described herein as including logic or a number of components, modules, or mechanisms. Modules may constitute either software modules (e.g., code stored on a machine-readable medium) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term hardware should be understood to encompass a tangible entity, be that an entity that is physically constructed, permanently configured (e.g., hardwired), or temporarily configured (e.g., programmed) to operate in a certain manner or to perform certain operations described herein. As used herein "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The methods 400, 500, and 600 may include one or more function blocks, modules, individual functions or routines in the form of tangible computer-executable instructions that are stored in a non-transitory computer-readable storage medium and executed using a processor of a computing device (e.g., a server, a personal computer, a smart phone, a tablet computer, a smart watch, a mobile computing device, or other personal computing device, as described herein). The methods 400, 500, and 600 may be included as part of any backend server (e.g., a map data server, a navigation server, or any other type of server computing device, as described herein), portable device modules of the example environment, for example, or as part of a module that is external to such an environment. Though the figures may be described with reference to the other figures for ease of explanation, the methods 400, 500, and 600 can be utilized with other objects and user interfaces. Furthermore, although the explanation above describes steps of the methods 400, 500, and 600 being performed by specific devices (such as a portable device 10, and a server device 60), this is done for illustration purposes only. The blocks of the methods 400, 500, and 600 may be performed by one or more devices or other parts of the environment.

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as an SaaS. For example, as indicated above, at least some of the operations may be performed by a group of computers (as examples of machines including processors), these operations being accessible via a network (e.g., the Internet) and via one or more appropriate interfaces (e.g., APIs).

Still further, the figures depict some embodiments of the example environment for purposes of illustration only. One skilled in the art will readily recognize from the following discussion that alternative embodiments of the structures and methods illustrated herein may be employed without departing from the principles described herein.

Upon reading this disclosure, those of skill in the art will appreciate still additional alternative structural and functional designs for orienting a user within a map display through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A method in a portable device for displaying map data, the method comprising:
obtaining, by one or more processors in a portable device, a request for map data of a geographic area;
displaying, by the one or more processors, a panoramic view of geolocated imagery for a first portion of the geographic area; and
simultaneously displaying, by the one or more processors, a non-panoramic map representation for a second portion of the geographic area, including displaying an intersection between the panoramic view and the non-panoramic map representation at a common geographic boundary shared between the first portion of the geographic area and the second portion of the geographic area, wherein the first and second portions of the geographic area do not overlap.

2. The method of claim 1, further comprising:
determining, by one or more processors, a current location and an orientation of the portable device, wherein the first portion of the geographic area includes the current location and the panoramic view is oriented according to the orientation of the portable device.

3. The method of claim 2, wherein the panoramic view is displayed in a lower portion of a user interface of the portable device and the non-panoramic map representation is displayed above the panoramic view in an upper portion of the user interface to generate an appearance of depth.

4. The method of claim 3, further comprising:
obtaining, by the one or more processors, a request for navigation directions to a destination selected by a user;
obtaining, by the one or more processors, a set of navigation directions from the current location of the portable device to the destination;
displaying, by the one or more processors, a first route indication overlaying the panoramic view based on one or more first maneuvers from the set of navigation directions corresponding to one or more locations within the first portion of the geographic area; and
displaying, by the one or more processors, a second route indication overlaying the non-panoramic map representation based on one or more second maneuvers from the set of navigation directions corresponding to one or more locations within the second portion of the geographic area.

5. The method of claim 4, further comprising:
comparing, by the one or more processors, the orientation of the portable device to the orientation of a first maneuver in the set of navigation directions; and
when the orientation of the portable device differs from the orientation of the first maneuver by more than a predetermined threshold amount, displaying by the one or more processors, an indication on the user interface of a direction for the user to turn.

6. The method of claim 2, wherein the non-panoramic map representation is rotated according to a difference between the orientation of the portable device and an orientation of the non-panoramic map representation.

7. The method of claim 2, wherein the current location and the orientation of the portable device are a first current location and a first orientation at a first point in time, the method further comprising:
determining, by the one or more processors, a second location or a second orientation of the portable device at a second point in time; and
displaying, by the one or more processors, an updated panoramic view and an updated non-panoramic map representation based on the second location or second orientation of the portable device.

8. The method of claim 1, further comprising:
obtaining, by the one or more processors, a gesture from a user applied at a location on the panoramic view or the non-panoramic map representation which does not correspond to a center position of the geographic area;
zooming, by the one or more processors, the panoramic view or the non-panoramic map representation according to the gesture without panning the panoramic view away from the geographic area.

9. A portable device comprising:
a user interface;
one or more processors coupled to the user interface; and
a non-transitory computer-readable memory coupled to the one or more processors and storing instructions thereon that, when executed by the one or more processors, cause the portable device to:
obtain a request for map data of a geographic area;
display, on the user interface, a panoramic view of geolocated imagery for a first portion of the geographic area;
simultaneously display, on the user interface, a non-panoramic map representation for a second portion of the geographic area; and
display an intersection between the panoramic view and the non-panoramic map representation at a common geographic boundary shared between the first portion of the geographic area and the second portion of the geographic area, wherein the first and second portions of the geographic area do not overlap.

10. The portable device of claim 9, wherein the instructions further cause the portable device to:
determine a current location and an orientation of the portable device, wherein the first portion of the geographic area includes the current location and the panoramic view is oriented according to the orientation of the portable device.

11. The portable device of claim 10, wherein the panoramic view is displayed in a lower portion of the user interface of the portable device and the non-panoramic map representation is displayed above the panoramic view in an upper portion of the user interface to generate an appearance of depth.

12. The portable device of claim 11, wherein the instructions further cause the portable device to:
obtain a request for navigation directions to a destination selected by a user;
obtain a set of navigation directions from the current location of the portable device to the destination;
display, on the user interface, a first route indication overlaying the panoramic view based on one or more first maneuvers from the set of navigation directions corresponding to one or more locations within the first portion of the geographic area; and
display, on the user interface, a second route indication overlaying the non-panoramic map representation based on one or more second maneuvers from the set of navigation directions corresponding to one or more locations within the second portion of the geographic area.

13. The portable device of claim 12, wherein the non-panoramic map representation is rotated according to a difference between the orientation of the portable device and an orientation of the non-panoramic map representation.

14. The portable device of claim 12, wherein the instructions further cause the portable device to:
compare the orientation of the portable device to the orientation of a first maneuver in the set of navigation directions; and
when the orientation of the portable device differs from the orientation of the first maneuver by more than a predetermined threshold amount, display, on the user interface, an indication of a direction for the user to turn.

15. The portable device of claim 10, wherein the current location and the orientation of the portable device are a first current location and a first orientation at a first point in time, the instructions further cause the portable device to:
determine a second location or a second orientation of the portable device at a second point in time; and
display, on the user interface, an updated panoramic view and an updated non-panoramic map representation based on the second location or second orientation of the portable device.

16. The portable device of claim 9, wherein the instructions further cause the portable device to:
obtain a gesture from the user applied at a location on the panoramic view or the non-panoramic map representation which does not correspond to a center position of the geographic area; and
zoom the panoramic view or the non-panoramic map representation according to the gesture without panning the panoramic view away from the geographic area.

17. A method in a server device for displaying map data, the method comprising:
receiving, at one or more processors in a server device, a request for map data of a geographic area;
generating, by the one or more processors, a panoramic view of geolocated imagery for a first portion of the geographic area;
generating, by the one or more processors, a non-panoramic map representation for a second portion of the geographic area including generating an intersection between the panoramic view and the non-panoramic map representation at a common geographic boundary shared between the first portion of the geographic area and the second portion of the geographic area, wherein the first and second portions of the geographic area do not overlap; and
causing, by the one or more processors, the panoramic view, the non-panoramic map representation, and the intersection between the panoramic view and the non-panoramic map representation to be displayed on a portable device.

18. The method of claim 17, further comprising:
receiving, at the one or more processors, a current location and an orientation of the portable device, wherein the first portion of the geographic area includes the current location and the panoramic view is oriented according to the orientation of the portable device;
receiving, at the one or more processors, a request for navigation directions from the current location of the portable device to a destination;
generating, by the one or more processors, a set of navigation directions from the current location to the destination;
generating, by the one or more processors, a first route indication based on one or more first maneuvers from the set of navigation directions corresponding to one or more locations within the first portion of the geographic area;
generating, by the one or more processors, a second route indication based on one or more second maneuvers from the set of navigation directions corresponding to one or more locations within the second portion of the geographic area; and
causing, by the one or more processors, the first route indication to be displayed on the portable device overlaying the panoramic view and the second route indication to be displayed on the portable device overlaying the non-panoramic map representation.

19. The method of claim 18, wherein generating the non-panoramic map representation for the second portion of the geographic area includes:
rotating, by the one or more processors, the non-panoramic map representation according to a difference between the orientation of the portable device and an orientation of the non-panoramic map representation.

20. The method of claim 17, further comprising:
filtering out, by the one or more processors, a portion of the panoramic view which represents a sky; and
replacing, by the one or more processors, the filtered out portion of the panoramic view with the non-panoramic map representation.

* * * * *